United States Patent [19]
Grimes

[11] Patent Number: 5,060,361
[45] Date of Patent: Oct. 29, 1991

[54] METHOD FOR SHADING A REAR WINDOW SHELF

[76] Inventor: Mildred Grimes, 1628 Calle Miradero, San Dimas, Calif. 91773

[21] Appl. No.: 542,732

[22] Filed: Jun. 22, 1990

Related U.S. Application Data

[63] Continuation of Ser. No. 425,415, Oct. 23, 1989, Pat. No. 4,997,226.

[51] Int. Cl.$^5$ .............................................. B60R 13/02
[52] U.S. Cl. ...................................... 29/450; 296/39.1
[58] Field of Search ........................................ 29/450

[56] References Cited

U.S. PATENT DOCUMENTS

| | | | |
|---|---|---|---|
| 1,530,784 | 5/1924 | Midgley | 296/97.7 X |
| 1,987,259 | 10/1933 | Koehler | 296/97.7 X |
| 2,207,224 | 7/1940 | Meares | 296/97.7 X |
| 4,458,738 | 7/1984 | Wilson | 296/39.1 X |
| 4,589,459 | 5/1986 | Lantrip | 296/136 X |
| 4,659,144 | 4/1987 | Reese | 297/184 |
| 4,784,426 | 11/1988 | Mannisto-Iches | 296/97.7 |
| 4,818,007 | 4/1989 | Mahoney | 296/97.7 X |

*Primary Examiner*—Timothy V. Eley
*Assistant Examiner*—C. Richard Martin
*Attorney, Agent, or Firm*—Christie, Parker & Hale

[57] ABSTRACT

A sun shade is provided which protects the rear window shelf and upper back seat areas of an automobile from harmful sun rays without noticeably obstructing sound from speakers or airflow from ventilation ducts mounted in the rear window shelf. The sun shade is comprised of a relatively opaque yet sound and air transmissive mesh material connected to a fully opaque material. The mesh material is releasibly mounted in the rear window shelf via cooperating pieces of hook and loop material respectively carried by the mesh material and the shelf. The fully opaque material extends over the upper portion of the back seat and may be made to match the color, material and style of the interior of the automobile.

6 Claims, 2 Drawing Sheets

METHOD FOR SHADING A REAR WINDOW SHELF

This is a continuation of application Ser. No. 07/425,415, filed Oct. 23, 1989, now U.S. Pat. No. 4,997,226.

FIELD OF THE INVENTION

The present invention relates generally to protecting and preserving portions of automotive and other vehicle interiors from harmful sun rays and in particular to protecting the rear window shelf and rear seat back areas without obstructing sound from speakers or airflow from ventilation ducts mounted in the rear window shelf.

BACKGROUND OF THE INVENTION

As automobiles, trucks and recreational vehicles become more expensive, consumers have become increasingly concerned with preserving and protecting their transportation investments. The visual appearance and physical condition of a vehicle can drastically affect its resale value. Accordingly, owners are concerned with preserving the interiors of their vehicles to forestall the premature fading of colors and rotting of fabrics and the unsightly cracking of the vinyl-covered portions of the interior. The areas of the interior which are most susceptible to sun damage are located beneath the windshield and rear window of the vehicle. This includes the front dash, rear window shelf and rear seat back areas. The sun damage problem is particularly acute in the southern parts of the United States, and other warm climate areas.

In order to combat the deteriorating effects of the sun, many solutions have been suggested ranging from chemical formulations to physical screening devices. Long chain chemical polymers have enjoyed some commercial success in recent years but require repeated periodic applications and are not suitable for fabric-lined portions of the interior.

Physical screening devices for vehicle interiors, such as those described in U.S. Pat. Nos. 4,458,738 to Wilson and 4,659,144 to Reese, are comprised of opaque material mounted on the seats, dash and rear deck surfaces of vehicles, thereby providing needed shielding from the sun. However, speakers, such as those used with radios and stereo systems and air ducts are frequently mounted in the dash and rear window shelf areas and the obstructing effects of these material covers limit their practical utilization.

Thus, there exists a substantial need for an improved method of protecting those areas in vehicle interiors most vulnerable to damage by the sun without interfering with the use of the vehicle's sound or airflow systems.

SUMMARY OF THE INVENTION

The present invention overcomes the sound and airflow obstructing problems associated with prior known devices by providing a sun screen for protecting the rear window shelf and upper portion of the rear seat back areas of a vehicle partially comprised of a material substantially transmissive to sound and airflow. A presently preferred embodiment of the invention includes a generally rectangular sheet of material having a first relatively opaque sound and airflow transmissive portion connected to a second fully opaque portion. The first portion is sized to generally cover the rear window shelf area of the vehicle. The second portion is dimensioned to overlie the upper portion of the rear seat back. The first portion of the material comprises a mesh or cloth fabric which provides a moderate degree of shading and is capable of passing sound from speakers and air from ventilation ducts mounted beneath the fabric without noticeable obstruction. The sun shade is releasably mounted to the rear window shelf by cooperating areas of hook and loop material, attached to the rear window shelf and the sound and air transmissive portion of the shade.

The hook and loop material permit easy installation and effectively hold the sun shade in place. The fully opaque portion of the shade is draped over the upper portion of the rear seat back affording a neat appearance to the automotive interior.

The foregoing and other advantages and distinguishing features of the invention are described in detail below and are recited in the appended claims.

DETAILED DESCRIPTION

Figure 1:
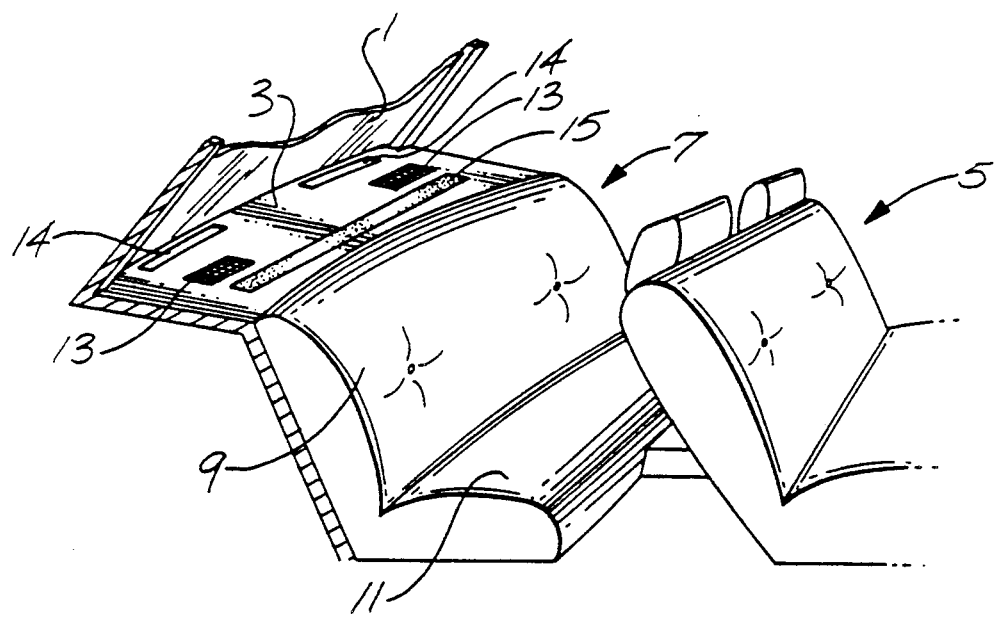
FIG. 1 is a schematic view of a rear interior portion of an automobile.

The presently preferred embodiment of the invention provides an improved way to shade the rear portion of the interior of an automobile or other vehicle. Referring to FIG. 1 there is illustrated a portion of the interior of a vehicle, such as an automobile, including a rear window 1, a rear window shelf 3, a front seat 5 and a rear seat 7. The rear seat 7 is comprised of a seat back 9 and a seat cushion 11. Speakers 13, connected to the automobile sound system, and air ducts 14, connected to the automobile ventilation system, are located in or below the rear window shelf 3.

The presently preferred sun shade of the invention is releasibly secured to the interior of the automobile by the use of cooperating first and second moieties of suitable releasable fastening or connecting arrangements. In the presently preferred sun shade, those moieties are pieces of cooperating hook and loop material which form respective parts of a releasable fastener commonly sold under the trademark VELCRO. Velcro ™ is available from Velcro U.S.A., Inc., Manchester, N.H. One or more pieces of loop material 15 are attached, as by bonding or mechanically securing, to the rear window shelf 3. The pieces of loop material 15 are preferably placed along a line across the rear window shelf 3, adjacent to the interface of the rear window shelf and the rear seat back 9. The pieces of loop material 15 can be provided as part of a kit (a retrofit kit) which contains the sun shade and may be attached by the user or owner of the vehicle.

Figure 2:
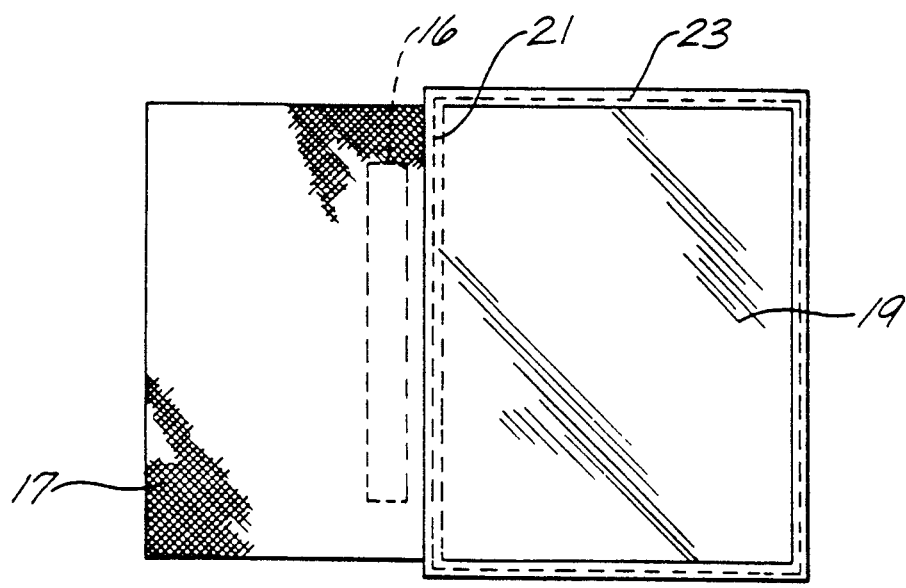
FIG. 2 is a top plan view of a presently preferred sun screen according to the present invention.

Referring now to FIG. 2, the sun shade comprises a flat substantially rectangular sheet of material having a partially opaque mesh screen or cloth fabric portion 17 and a fully opaque portion 19 attached to the mesh screen or cloth fabric portion. The portions 17, 19 are comprised of thin flexible materials and may be compatible in fabric, color and style to the interior of the automobile. For example, for a vinyl covered interior, a vinyl covered mesh fabric is used, such as that marketed under the tradename SHADEBRELLA, for the mesh portion 17. SHADEBRELLA TM is available from Phifer Wire Products, Tuscaloosa, Ala. Upholstery grade vinyl is used for the fully opaque portion 19. One or more pieces of hook material 16 are placed on the underside of the mesh portion 17 in a pattern to cooperate with the pieces of loop material 15 affixed to the rear window shelf 3. Attachment of the pieces of hook material 16 to the mesh portion 17 is preferably by stitching, but can be accomplished by bonding.

The two portions 17, 19 are stitched together in a seam 21 along their long edges and the opaque portion 19 is trimmed or covered with edging tape 23 around its exposed perimeter to ensure it does not fray or fall apart when in use.

Figure 3:
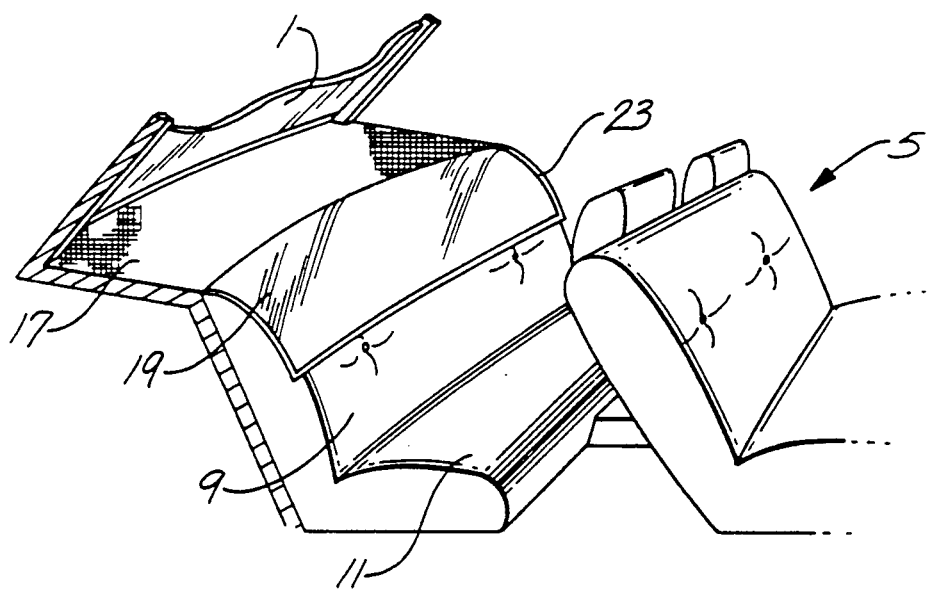
FIG. 3 is a schematic view of the rear interior portion of the automobile depicted in FIG. 1, with the sun screen shown in FIG. 2 in place protecting the rear window shelf and the upper portion of the rear seat back areas of the interior.

FIG. 3 illustrates the sun shade when placed within an automobile, covering the rear window shelf 3 and the upper portion of the rear seat back 9. The mesh portion 17 of the sun shade is trimmed to generally conform to the shape of the rear window shelf 3 and is mounted on the shelf by means of the pieces of the hook material 16 attached to its under surface.

Figure 4:
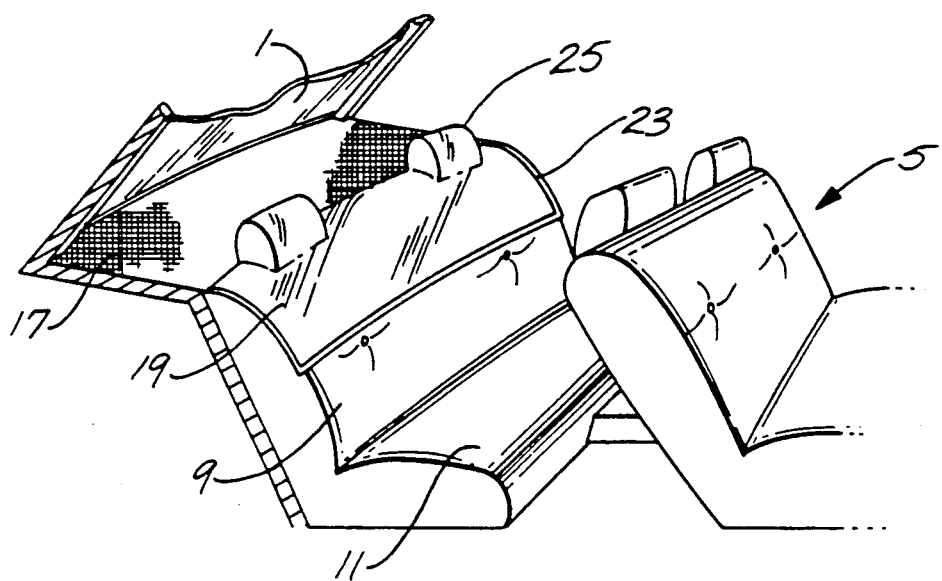
FIG. 4 is a schematic view of the rear interior portion of an automobile, with another embodiment of the sun screen in place protecting the rear window shelf, rear seat headrests and the upper portion of the rear seat back areas of the interior.

The fully opaque portion 19 is extended over the upper portion of the rear seat back 9 and may be styled to approximately fit the shape and design of the rear seat back. When the rear seat back additionally includes headrests 25, as depicted in FIG. 4, the opaque portion 19 additionally includes pockets configured to cover the headrests.

Although the presently preferred embodiment of the present invention has been described above and illustrated in the drawings, those skilled in the relevant arts will have no difficulties making changes and modifications in the different described elements of the invention in order to meet their specific requirements or conditions. For example, when the rear window shelf 3 is covered by a carpeting or other material comprising loop ends, the pieces of loop material 15 may be omitted and the pieces of hook material 16 may be attached directly to the loops of the carpeting. The partially opaque portion 17 may be substantially comprised of the same material as the opaque portion 19, having mesh fabric inserts placed in only those locations where it overlies the speakers 13 and the air ducts 14. The opaque portion 19 may be attached to the mesh portion 17 by hook and loop material permitting its removal when it is preferable to only use the mesh portion as a sun shade. The sun shade may be adapted to be attached to the front dash of a vehicle, such as by hook and loop fasteners, having its mesh portion overlying speakers and air ducts mounted in the dash. Such changes and modifications may be made without departing from the scope and spirit of the invention as set forth in the following claims.

What is claimed is:

1. A method for shading from the sun a rear window shelf with sound and/or air ports and a rear seat back of a motor vehicle interior, the method comprising the step of covering the shelf and the back with a sheet of flexible material that has a partially opaque sound and air transmissive portion fitting and overlying the shelf and a fully opaque portion fitting and overlying the top portion of the back.

2. A method for shading from the sun a rear window shelf with sound and/or air ports and a rear seat back of a motor vehicle interior, the method comprising the steps of:
   covering the shelf and the back with a sheet of flexible material that has a partially opaque sound and air transmissive portion fitting and overlying the shelf and a fully opaque portion fitting and overlying the top portion of the back; and
   fastening the partially opaque portion to the shelf.

3. A method for shading from the sun a rear window shelf and a rear seat back of a motor vehicle interior, the rear window shelf having sound and/or air ports, the method comprising the step of:
   covering the rear window shelf and seat back by draping a flexible material over the shelf and back, the material having a partially opaque portion fitting and overlying the shelf, and for allowing sound and air transmission, yet providing shade from the sun, and the material having a fully opaque portion for fitting and overlying the back, and for providing shade from the sun, the partially opaque portion being positioned over the shelf, and the fully opaque portion being positioned over the back.

4. A method as in claim 1, wherein the rear seat back comprises headrests, and the step of covering includes covering the headrests with the fully opaque portion.

5. A method as in claim 2, wherein the rear seat back includes headrests, and the step of covering includes covering the headrests with the fully opaque portion.

6. A method as in claim 3, wherein the rear seat back includes headrests, and the step of covering includes covering the headrests with the fully opaque portion.

* * * * *